US006364390B1

(12) United States Patent
Finneman

(10) Patent No.: US 6,364,390 B1
(45) Date of Patent: Apr. 2, 2002

(54) VEHICLE DISPLAY MONITOR SYSTEM WITH IMPROVED RETENTION SYSTEM

(75) Inventor: Darrell R. Finneman, Albany, OR (US)

(73) Assignee: Rosen Products, LLC, Eugene, OR (US)

( * ) Notice: Subject to any disclaimer, the term of this patent is extended or adjusted under 35 U.S.C. 154(b) by 0 days.

(21) Appl. No.: 09/627,693

(22) Filed: Jul. 28, 2000

(51) Int. Cl.[7] .................................................. B60R 7/04
(52) U.S. Cl. ...................... 296/37.7; 296/37.8; 224/929; 224/534
(58) Field of Search ............................... 296/24.1, 37.7, 296/37.8; 224/929, 539; 16/71; 292/95, 121, 122, 124, 98, 224, 197, DIG. 37

(56) References Cited

U.S. PATENT DOCUMENTS

| 4,824,159 | A | * | 4/1989 | Fluharty et al. | ............ 296/37.7 |
|---|---|---|---|---|---|
| 5,775,762 | A | * | 7/1998 | Vitito | .......................... 296/37.7 |
| 5,785,362 | A | * | 7/1998 | Nadherny | ..................... 292/98 |
| 5,927,784 | A | * | 7/1999 | Vitito | .......................... 296/37.7 |
| 6,039,362 | A | * | 3/2000 | Nadherny | ..................... 292/197 |
| 6,115,086 | A | * | 9/2000 | Rosen | ..................... 296/37.8 X |
| 6,125,303 | A | * | 9/2000 | Mola et al. | ............. 296/37.8 X |
| 6,157,418 | A | * | 12/2000 | Rosen | ..................... 296/37.7 X |

* cited by examiner

Primary Examiner—Stephen T. Gordon
Assistant Examiner—Lori L Coletta
(74) Attorney, Agent, or Firm—Kolisch, Hartwell, Dickinson, McCormack & Heuser

(57) ABSTRACT

The invention provides a ceiling-mountable display monitor system with an improved monitor retention system. The display monitor system includes a display monitor that is mounted on the ceiling portion of a vehicle by a mounting assembly. The monitor system includes a display surface and a retention system adapted to selectively engage a catch on the display monitor to retain the monitor in a stowed configuration proximate the ceiling portion of the vehicle. Upon actuation by the user, the retention system releases the monitor for pivotal or other movement away from the ceiling portion of the vehicle to a viewing configuration. In the viewing configuration, the viewing surface is oriented to viewing by passengers of the vehicle. The retention system includes a retainer pivotally mounted about a pivot axis and an actuator with a user-manipulable element adapted to selectively pivot the retainer relative to its pivot axis. The retainer includes a contact surface adapted to engage a corresponding surface on the catch of the display monitor. The contact surface is oriented to prevent unintentional release of the display monitor.

16 Claims, 4 Drawing Sheets

VEHICLE DISPLAY MONITOR SYSTEM WITH IMPROVED RETENTION SYSTEM

FIELD OF THE INVENTION

The present invention relates to display systems for passenger vehicles, and more particularly, to a display system with a retention system for selectively retaining a display monitor in a desired orientation.

BACKGROUND OF THE INVENTION

Display monitors have become a popular accessory for passenger vehicles, and may be used in a wide variety of applications. For example, a display monitor may be used in a vehicle as a computer monitor, a navigation display, a television, a closed-caption display for exterior cameras, etc. While some display monitors are installed during manufacture of the vehicle, others are installed after the vehicles are completed. In either case, the display monitor should be mounted securely within the passenger compartment of the vehicle interior.

Vehicle display monitors may be mounted at any of various locations within the passenger compartment of a vehicle, depending on the vehicle configuration and the intended use of the monitor. Monitors may be mounted on, or partially or totally embedded in, the ceiling portion of the vehicle. Ceiling-mounted monitors are popular because they may be stowed in an out-of-the-way position on the ceiling of the vehicle, and can present the monitor's viewing surface for easy viewing by passengers of the vehicle. Typically, ceiling-mounted monitors are retained in their stowed positions either by friction or by a spring-biased latch. With either of these systems, forces imparted to the vehicle and the display monitor during use, such as when the vehicle travels over bumps or grates or other irregular surfaces in the road, may cause the monitor to deploy unintentionally. Spring-biased latches may utilize stronger springs to counteract this problem, however, increasing the spring force retaining the latch in an unactuated position also increases the force that a user must apply to release the display monitor from engagement with the latch. Increasing the force required increases the number of users that cannot effectively use the monitor because they lack the strength to activate the latch to deploy the monitor from its stowed position.

SUMMARY OF THE INVENTION

The invention provides a ceiling-mountable display monitor system with an improved monitor retention system. The display monitor system includes a display monitor that is mounted on the ceiling portion of a vehicle by a mounting assembly. The monitor system includes a display surface and a retention system adapted to selectively engage a catch on the display monitor to retain the monitor in a stowed configuration proximate the ceiling portion of the vehicle. Upon actuation by the user, the retention system releases the monitor for pivotal or other movement away from the ceiling portion of the vehicle to a viewing configuration. In the viewing configuration, the viewing surface is oriented for comfortable viewing by passengers of the vehicle. The retention system includes a retainer pivotally mounted about a pivot axis and an actuator with a user-manipulable element adapted to selectively pivot the retainer relative to its pivot axis. The retainer includes a contact surface adapted to engage the catch of the display monitor. The contact surface is oriented to prevent unintentional release of the display monitor.

DETAILED DESCRIPTION AND BEST MODE OF THE INVENTION

Figure 1:
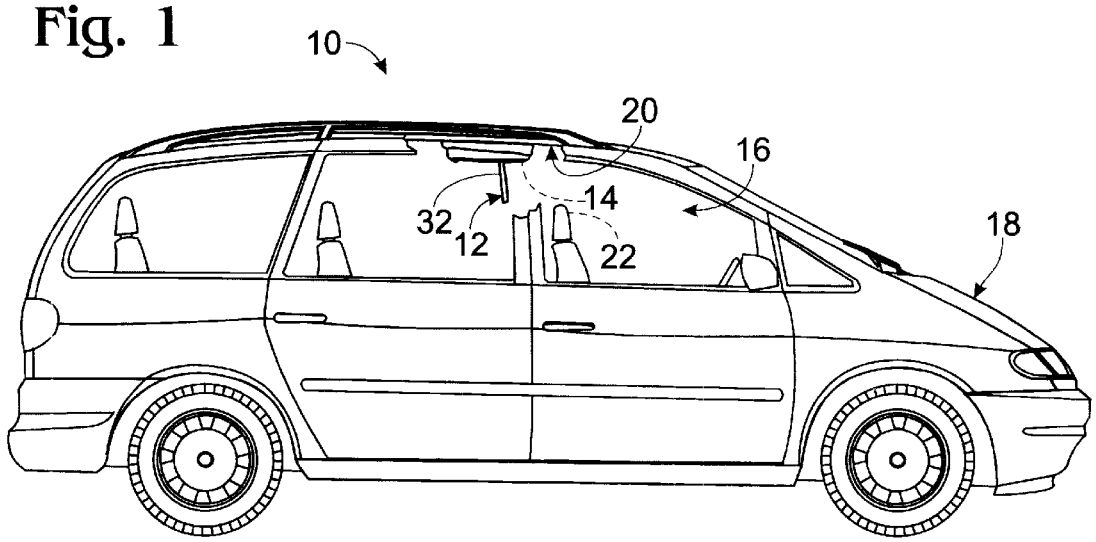
FIG. 1 is a side elevation of an exemplary passenger vehicle having a display monitor system according to the present invention. The vehicle is partially fragmented to show the display monitor mounted on the ceiling of the vehicle.
Figure 2:
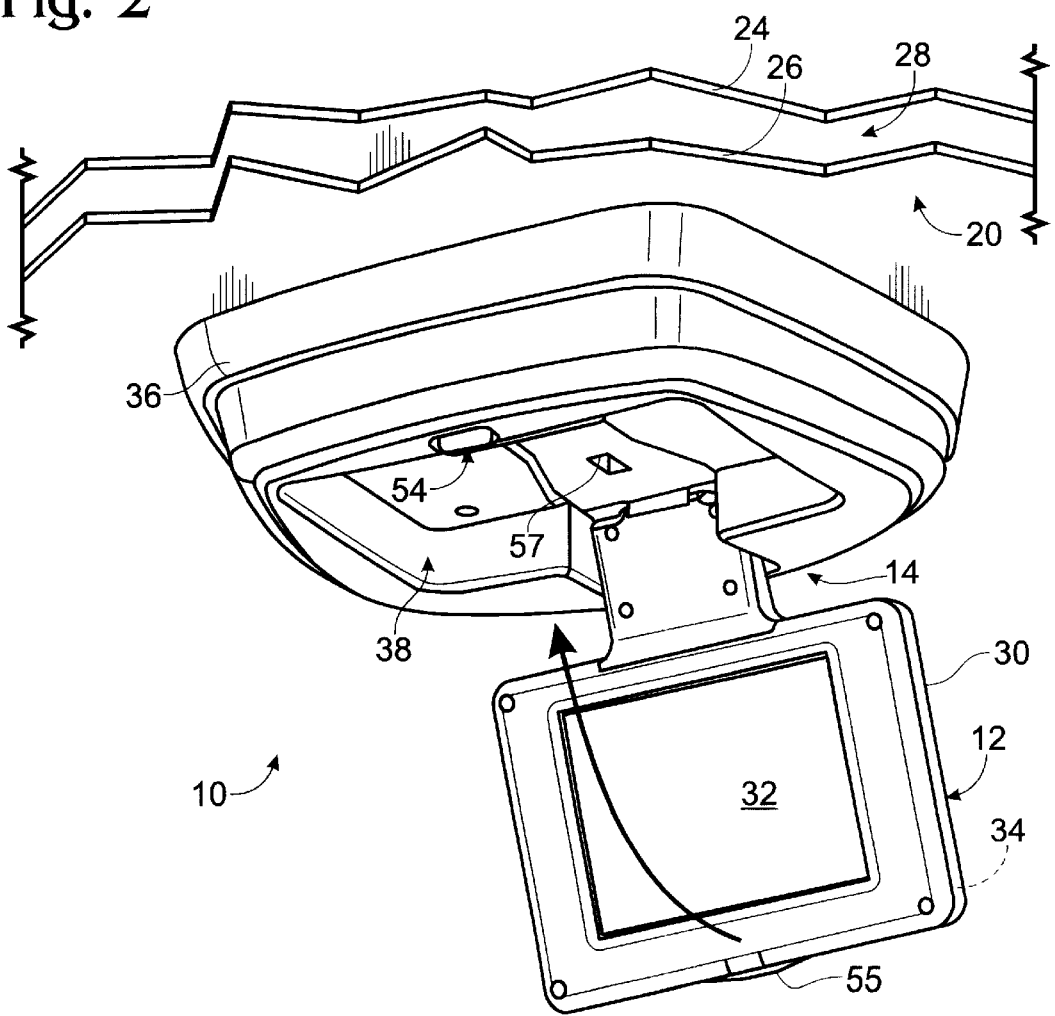
FIG. 2 is a fragmentary isometric view of the monitor system of FIG. 1.

A display monitor system for a passenger vehicle according to the present invention is indicated generally at 10 in FIGS. 1 and 2. System 10 includes a display monitor 12 and a mounting assembly 14 coupled to the display monitor. Mounting assembly 14 secures the display monitor within the passenger compartment 16 of a vehicle 18. More specifically, assembly 14 secures the monitor to ceiling portion 20 of the vehicle.

In FIG. 1, monitor system 10 is shown installed in a passenger vehicle 18 in the form of a van. However, it will be appreciated that system 10 may be installed in any type of passenger vehicle including a car, truck, motor home, etc. Additionally, while system 10 is shown installed in the passenger compartment 16 of vehicle 18 rearward of the driver's seat 22 for viewing by rear passengers, it will be understood that system 10 may be installed at any desired location in the passenger compartment for viewing by any or all of the occupants.

The ceiling portion of vehicle 18 is shown in more detail in FIG. 2. Ceiling portion 20 extends above at least a portion of passenger compartment 16 and includes at least a portion of roof 24 of vehicle 18. Although not required, ceiling portion 20 may include a variety of structural members (not shown) such as ribs, beams, etc. In FIG. 2, ceiling portion 20 is shown including a headliner 26 extending beneath at least a portion of roof 24. Headliner 26 is typically made of a relatively lightweight material such as a foam board, paper board, plastic, etc. The headliner may have an aesthetic face or covering (not shown) on its lower surface to match the interior of passenger compartment 16. The covering may be formed of any suitable material such as fabric, vinyl, etc., and may be attached to the headliner by gluing, sewing, or other suitable means. Headliner 26 may also have a similar or dissimilar covering on its upper surface, or it may have no covering.

As shown, headliner 26 is spaced-apart from roof 24 and thereby forms a cavity 28 between the ceiling and headliner. The dimensions of cavity 28 typically will vary between vehicles, with typical spaces being in the range of approximately 0.375-inch to approximately 1.250-inches from the top of the headliner to the bottom of the roof. However, it should be understood that vehicles containing the monitor system described herein may have no headliner, no cavity between their headliners and roofs, or cavities of sizes outside of the range recited above. In addition, structural features on the ceiling portion, such as ribs and other supports, may be closer to the headliner than the surrounding roof, or may even be in contact with the headliner. Similarly, the monitor system may be coupled to various portions of the ceiling portion and may be at least partially or even totally embedded in the ceiling portion. For example, in FIG. 3, monitor system 10 is shown partially embedded within the ceiling portion.

Display monitor 12 may be any type of display device as needed for a particular application. For example, monitor 12 may display broadcast video content, recorded video content, or video content created by associated electronics in communication with monitor 12. Examples of such content include television programs, recorded video content (such as from a video cassette player or video-disc player), and video content from a personal computer, navigation system, or an onboard camera.

Figure 3:
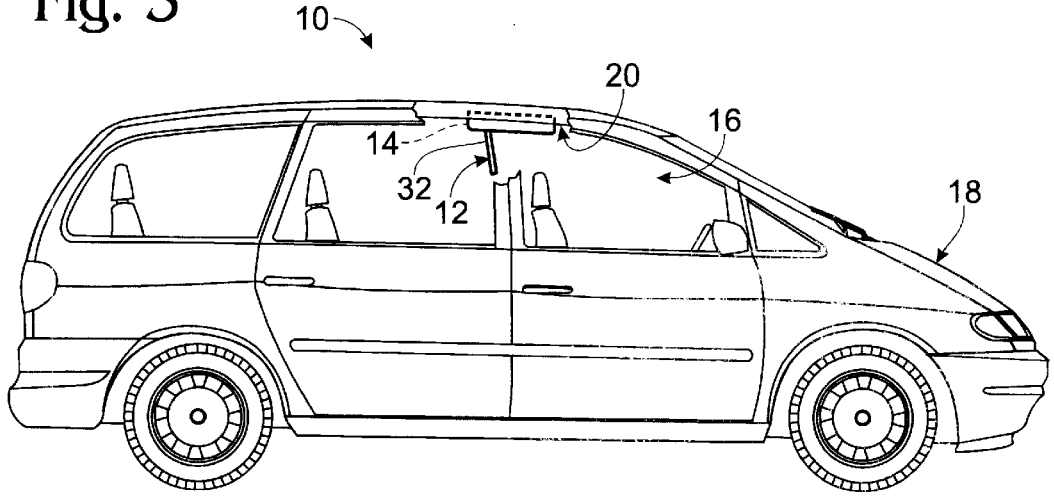
FIG. 3 is side elevation view of another embodiment of the monitor system of FIG. 1.
Figure 4:
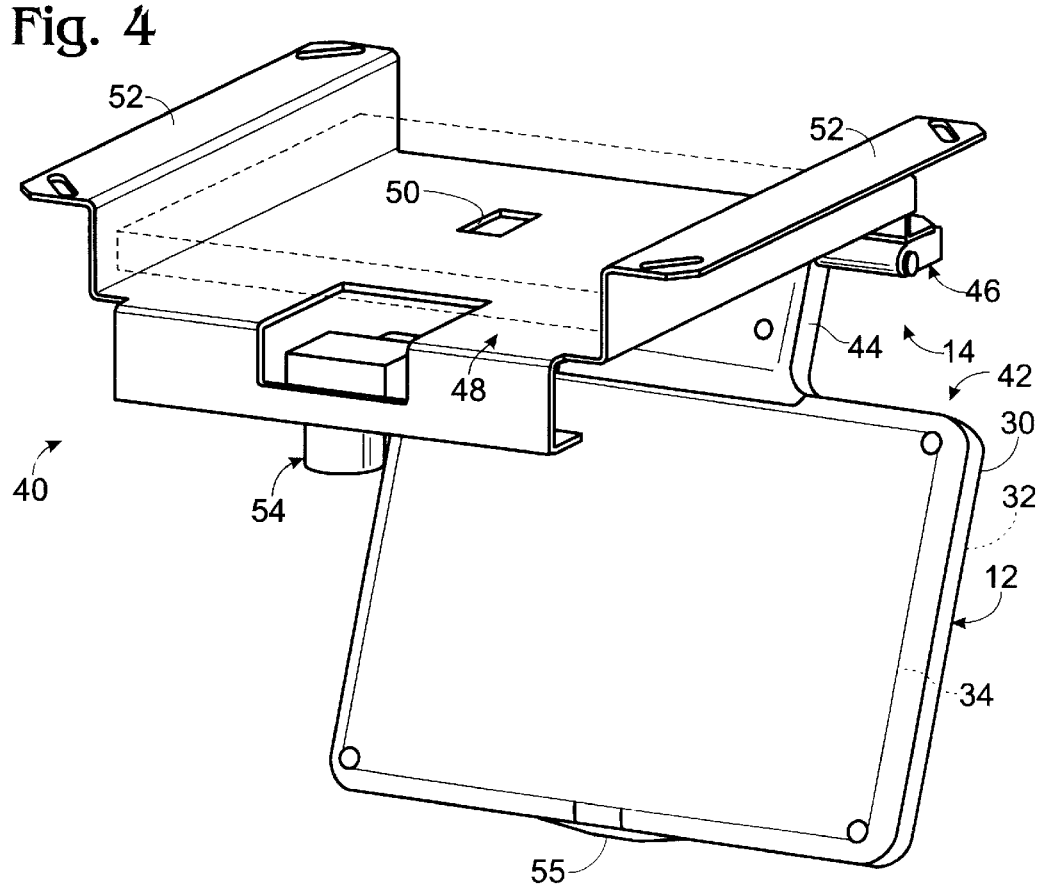
FIG. 4 is an isometric view of the monitor system of FIG. 2 removed from the vehicle.

In the exemplary embodiment, monitor 12 is in the form of a flat-panel display such as are well known to those of skill in the art. Alternatively, the display monitor may be a cathode ray tube, or any other type of display whether currently known or later developed. As shown, monitor 12 includes a housing 30 and a viewing surface 32 through which video images are presented for viewing by the user. Surface 32 may be oriented to face generally toward the ceiling portion, such as shown in FIGS. 1 and 2, or alternatively may be oriented to face generally away from the ceiling portion, such as shown in FIGS. 3 and 4. In a firther variation, monitor 12 may be selectively oriented between these orientations, either when installed, or after installation. Monitor 12 may include some or all of the display system's electronics 34, which may include, for example, a suitable power source, one or more control switches or devices, and devices for receiving and or creating the video content to be displayed. Any portion of the electronics not contained within housing 30 may be contained in the mounting assembly (such as schematically illustrated in FIG. 4) or elsewhere in the vehicle, or may be located external the vehicle and communicate with the display system from a remote location.

In FIG. 2, a cover, or shroud, 36 is shown. Shroud 36 is adapted to at least partially enclose the monitor when the monitor is in the stowed configuration. In the exemplary embodiment, shroud 36 is attached to mounting assembly 14 and provides an aesthetic cover for the mounting assembly. The shroud may be attached to the base assembly by any suitable means including screws, clips, adhesive, hook-and-loop devices, snap-on connectors, etc. The shroud includes a recess adapted to at least partially receive the display monitor when the monitor is in the stowed position. The shroud is typically constructed of plastic, metal or any other suitable material and may be trimmed to lie flat against the bottom surface of the headliner. Alternatively, shroud 36 may be mounted on headliner 26, roof 24 or any other portion of ceiling portion 20. Monitor system 10 may also be formed without a shroud or other cover, such as shown in FIG. 3.

In FIG. 4, mounting assembly 14 is shown in more detail. As shown, assembly 14 includes a base portion 40 that is secured to the vehicle's ceiling portion, and a display portion 42, which includes at least monitor 12, that is pivotal with respect to the base portion. As shown, monitor 12 includes a pivot arm 44 that extends from housing 30 and is pivotally coupled to base portion 40 by one or more pivot couplings, or hinges, 46. Pivot arm 44 is not required, and monitor 12 may be coupled directly to the base portion or ceiling portion via pivot couplings 46.

As shown in FIG. 4, base portion 40 defines an enclosure 48 sized to house a portion of the display system's electronics 34. As shown, electronics 34 may communicate with monitor 12 either through a passage 50 or through a passage formed in pivot couplings 46. Base portion 40 also includes mounts 52 adapted to be secured to the vehicle's ceiling portion, such as with screws, bolts, rivets, or other suitable releasable or permanent fasteners. Base portion 40 further includes a retention system 54 that is adapted to selectively engage a catch 55 on monitor 12 to retain the monitor in its stowed configuration. The details of retention system 54 will be discussed in more detail below.

Base portion 40 or display portion 42 may further include a switch 57 to activate the monitor when in the viewing position, and to deactivate the monitor when in the stowed position. Switch 57 may be any suitable switch such as an optical switch actuated by ambient light when the monitor is pivoted to the operative position, or a mechanical switch actuated by the display monitor or by a user. Alternatively, the monitor may be actuated by a switch or button on a remote control device. The mounting assembly may also include a biasing member such as a spring (not shown), which is adapted to bias the monitor toward the viewing configuration when retention system 54 is actuated.

Figure 5:
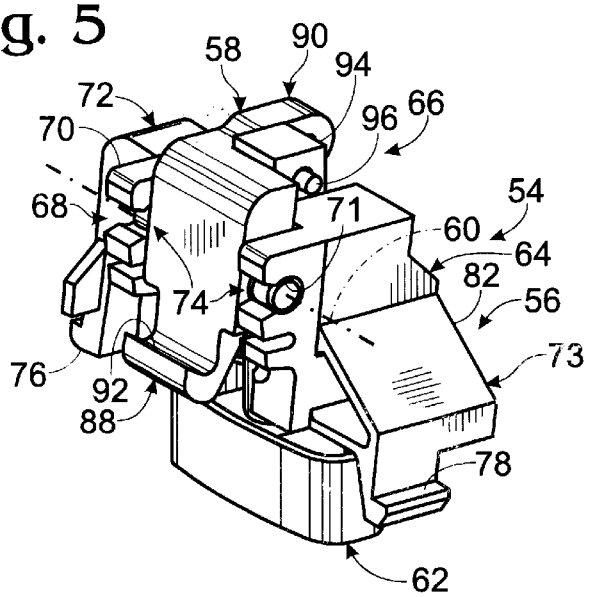
FIG. 5 is an isometric view of a retention system of the monitor systems of FIGS. 1 and 3.
Figure 6:
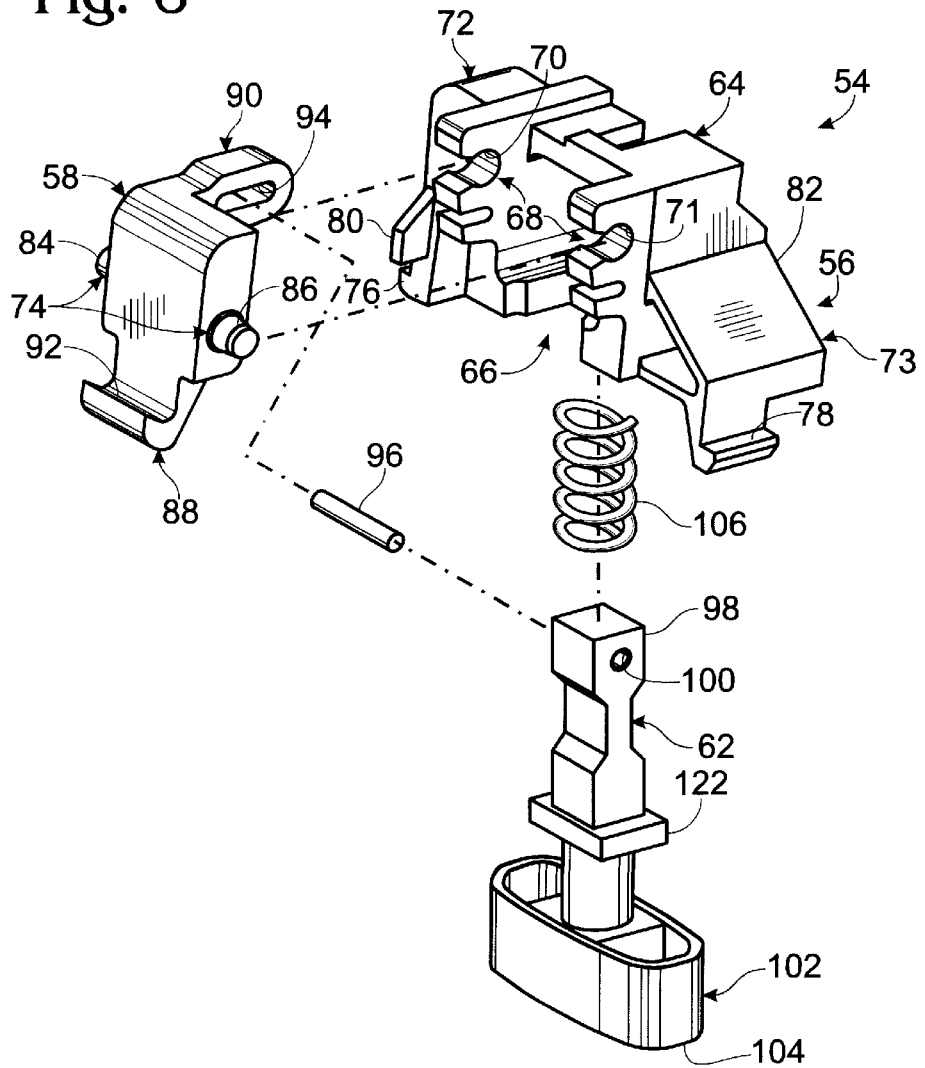
FIG. 6 is an exploded isometric view of the retention system of FIG. 5.

In FIGS. 5 and 6, retention system 54 is shown in more detail. As shown, system 54 includes a body 56, a retainer 58 that is pivotal about a pivot axis 60 relative to the body, and an actuator 62.

Body 56 secures the rest of retention system 54 to base portion 40 of the mounting assembly or to another suitable support structure, such as ceiling portion 20. As shown, body 56, includes a central portion 64 that defines a passage 66 through which at least a portion of actuator 62 may extend, as discussed in more detail below. Body 56 further includes a body coupling assembly 68 that is adapted to receive and support retainer 58 for pivotal movement between its unactuated and actuated positions. As shown, coupling assembly 68 includes a pair of axially spaced clips 70 and 71 into which corresponding portions of the subsequently described retainer coupling assembly 74 are pivotally received.

Figure 7:
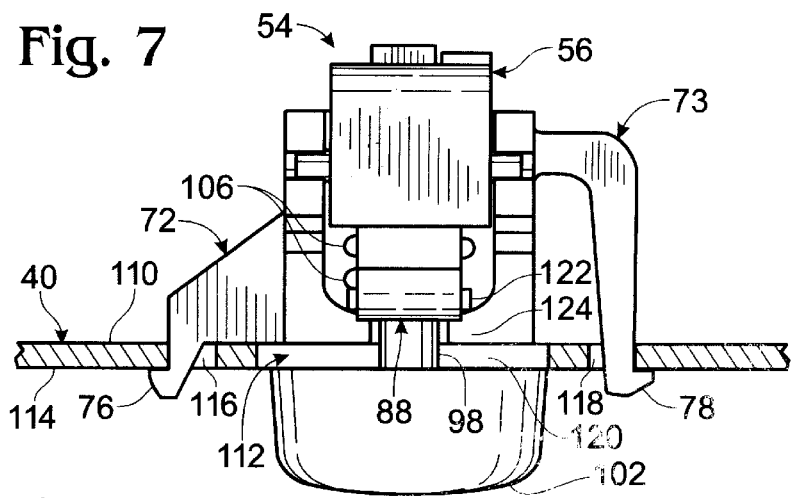
FIG. 7 is an end elevation view of the retention system of FIG. 5, with the retention system mounted on a base.
Figure 8:
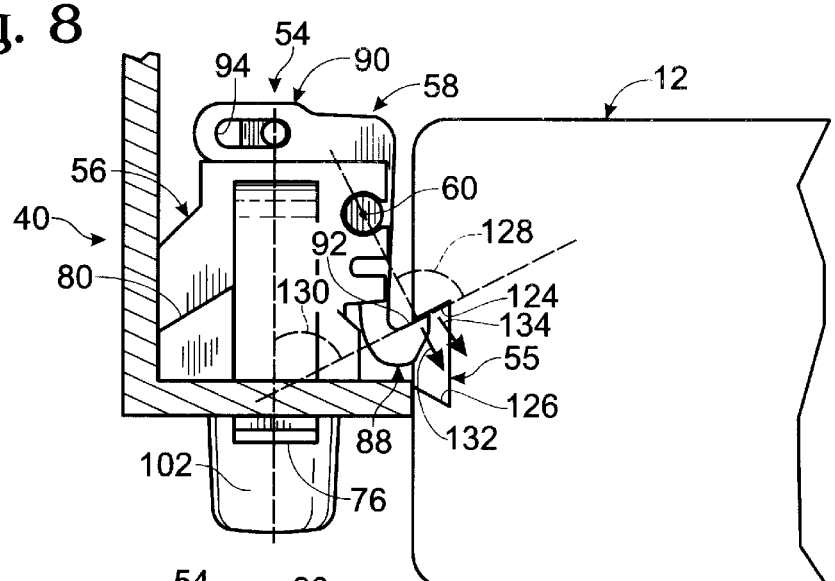
FIG. 8 is a side elevation view showing the retention system of FIG. 5 mounted on a base and engaging a display monitor in a stowed configuration.
Figure 9:
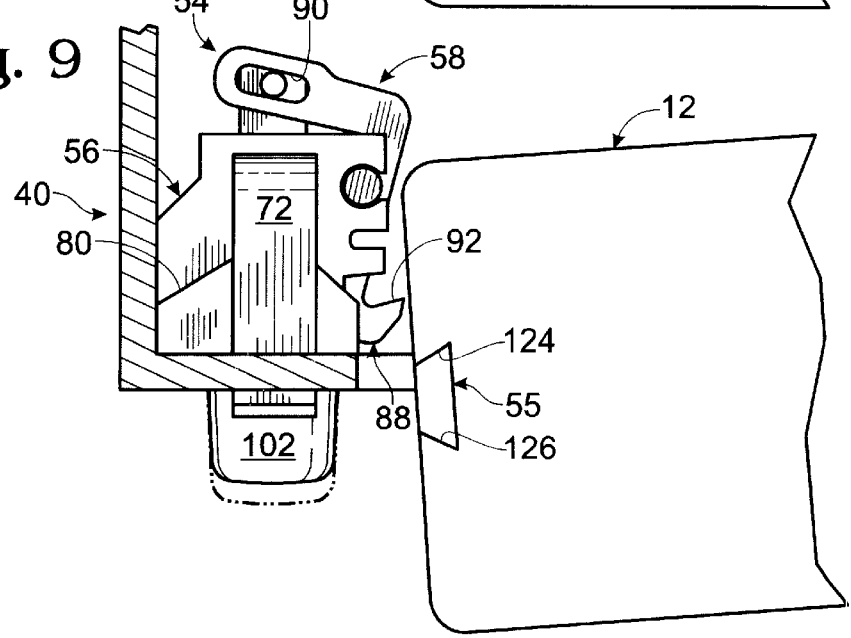
FIG. 9 is the side elevation view of FIG. 8, with the retention system actuated to release the display monitor.

Also shown in FIGS. 5 and 6 is a pair of supports 72 and 73 that extend from central portion 64 and include terminal feet 76 and 78. Supports 72 and 73 include stabilizers 80 and 82 that provide stability to body 56 by engaging the structure to which the base is mounted, such as base portion 40, as shown in FIGS. 7–9.

Retainer 58 includes retainer coupling assembly 74, which as shown in FIGS. 5 and 6 takes the form of a pair of axially aligned projections 84 and 86 that are each received into a respective one of clips 70 and 71. It should be understood that the specific structure of the coupling structures shown in FIGS. 5 and 6 are not essential to retention system 54 and that any other suitable mechanism for coupling retainer 58 to body 56 for pivotal movement may be used. For example, the structure to which at least one of the clip and projection assemblies shown in FIGS. 5 and 6 are mounted may be reversed. Similarly, other forms of coupling structures may be used.

Retainer 58 includes a monitor-engaging portion 88 and an actuator-engaging portion 90. Monitor-engaging portion 88 includes a contact surface 92, which is adapted to engage a corresponding surface on monitor 12 when the retainer is in its unactuated position and the monitor is in its stowed position. Although referred to and illustrated to provide a two-dimensional surface of contact with monitor 12, it should be understood that the term "contact surface" includes any surface that provides one or more points of contact with the monitor. A plurality of points of contact is preferred over a single point of contact, with a line of contact being preferred and an entire surface of contact being even more preferred.

Actuator-engaging portion 90 is coupled to actuator 62 so that the retainer pivots relative to body 56 responsive to the subsequently described movements of the actuator. As shown, actuator-engaging portion 90 includes a race, or track, 94 into which a linkage 96 is received and travels within a defined range of positions responsive to the relative position of actuator 62.

Actuator 62 includes a shaft 98 that extends into passage 66 and is coupled to actuator-engaging portion 90 by linkage 96. As shown, shaft 98 includes a bore 100 through which a portion of linkage 96 extends. Actuator 62 further includes a user-manipulable element 102 that allows a user to selectively actuate the retention system. As shown, element 102 takes the form of a button 104, however, any other suitable structure, or assembly of interconnected elements, that allows a user to urge the actuator to its actuated position may be used. Other suitable elements 102 include slides, levers, pulls and the like. As perhaps best seen in FIG. 6, actuator 62 includes a spring 106 that biases the actuator to its unactuated position, which as will be discussed subsequently, corresponds to the position in which contact surface 92 is positioned to engage monitor 12. This spring-biasing of retention system 54 provides a positive force urging the retainer in contact with monitor 12, when monitor 12 is in its stowed position. It should be understood that spring 106 may take forms other than the coil spring shown in FIG. 6 and that spring 106 may act upon other portions of retention system 54, either in addition to actuator 62 or as an alternative to acting directly upon actuator 62. For example, spring 106 may act upon the retainer below pivot axis 60 to urge the monitor-engaging portion into position for engaging monitor 12.

In FIG. 7, retention system 54 is shown mounted on base portion 40 of mounting assembly 14. It is within the scope of the invention that system 54 may be mounted on a support that does not form part of mounting assembly 14, such as a support or other component of ceiling portion 20. In FIG. 7, central portion 64 is shown engaging the upper surface 110 of base portion 40 and feet 76 and 78 extend through portion 40 and engage the lower surface 114. As shown, base portion 40 defines a passage 112 with regions 116 and 118 for feet 76 and 78 to pass through, as well as a region 120 for a portion of actuator 62 to pass. In the embodiment shown, the retention system is removably mounted on base portion 40 by feet 76 and 78. Furthermore, this construction does not require any additional parts, such as screws, washers, nuts and the like to install the system on portion 40. It is within the scope of the invention that other removable fasteners, such as screws, bolts and the like may be used, as well as permanent fasteners, such as adhesives, welds, rivets and the like. Similarly, body portion 56 of the retention system could be integrally formed with base portion 40 of the mounting structure. In FIG. 7, it can also be seen that actuator 62 includes a stop 122 that engages a portion 124 of body 56 to limit the extent that actuator 62 may be urged away from its actuated position by spring 106.

In FIGS. 8 and 9, the engagement of monitor 12 with retention system 54 is illustrated in more detail. In FIG. 8, the retention system is shown in its unactuated position, in which contact surface 92 of monitor-engaging portion 88 is positioned to engage monitor 12. As shown, monitor 12 is also in its stowed position, in which the monitor is engaged by surface 92 and the monitor is retained proximate the ceiling portion of vehicle 18. By proximate, it is meant that the monitor is retained near, on, at least partially embedded within, or completely embedded within, the ceiling portion of the vehicle, as opposed to the monitor's viewing configuration, in which the monitor is pivoted away from its stowed position and into the passenger area, such as shown in FIGS. 1 and 3. As shown, monitor 12 includes a catch, or catch assembly 55, that includes at least one surface 124 oriented to be engaged by contact surface 92 to retain the monitor in its stowed position. As shown, catch 55 extends into the housing of monitor 12. It is within the scope of the invention that catch 55 may include any suitable portion of monitor 12, or structure attached thereto, that may be selectively engaged. by retainer 58 to selectively retain the monitor in its stowed position.

A second, oppositely oriented catch surface 126 also is shown. Surface 126 is engaged by contact surface 92 when monitor 12 is installed upside-down from the orientation shown in FIG. 8. As discussed, in some embodiments, monitor 12 is selectively reversible so that its viewing surface either faces generally toward or away from the passenger compartment when the monitor is in its stowed configuration. In embodiments where the orientation of the monitor is not reversible, only a single catch surface is needed.

In FIG. 9, the actuated position of retention system 54 is shown. In this position, actuator 62 has been moved along its travel path from its unactuated position, which is shown in FIG. 8 and in dashed lines in FIG. 9. This movement of actuator 62, such as by a user depressing user-manipulable element 102, causes retainer 58 to pivot about axis 60, thereby causing monitor-engaging portion 88 to be drawn out of a position for engaging monitor 12. As shown, linkage 96 has also traveled within race 94 through the movement of actuator 62 along its travel path. In FIG. 9, monitor 12 is free from engagement with retention system 54 and has been pivoted away from its stowed configuration, which is shown in FIG. 8. As discussed, monitor may be biased to pivot away from its stowed configuration upon release of the monitor by retention system 12.

As perhaps best seen in FIG. 8, contact surface 92 is closer to monitor 12 than pivot axis 60. Contact surface 92 is oriented at less than an obtuse angle 128 relative to the travel path of actuator 62. Preferably, this angle is less than 90° so that downward forces exerted upon portion 88 by monitor 12 will not cause the retainer to pivot toward its actuated position. As shown, surface 92 extends at an angle 130 of approximately 68° relative to the shaft, or long axis, of actuator 62. Surface 92 may also be described as extending at an angle of approximately 68° relative to the direction of movement, or travel path, of actuator 62, and as being on the opposite side of the pivot axis than the shaft, or travel path, of actuator 62. Other angles may be used as well. For example, with the configuration shown in FIGS. 8 and 9, angles in the range of approximately 30° and approximately 90° may be used, with angles in the range of approximately 50° and approximately 80° being preferred, and angles in the range of approximately 60° and approximately 70° being more preferred.

Contact surface 92 may also be described as being oriented so that the force vector resulting from the monitor engaging the contact surface is not directed to urge the retention system toward its actuated position. Preferably, force exerted upon surface 92 by monitor 12 is in a neutral direction, such as along a force vector 132 through pivot axis 60 normal to the contact surface, or in a direction oriented to urge the retention system toward its unactuated position, such as a force vector 134. Essentially, the orientation of contact surface 92 causes forces that otherwise would tend to cause unintentional release of the monitor to instead be directed so that they do not urge the retention system toward its actuated position, thereby preventing unintentional release of the monitor.

Still another way of describing the engagement of monitor 12 by retention system 54 is that the normal force produced, when the monitor is urged toward its viewing configuration while the retention system is still in engagement with the monitor, is directed to urge the retention system toward its unactuated position.

It is believed that the disclosure set forth above encompasses multiple distinct inventions with independent utility. While each of these inventions has been disclosed in a selected form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A display monitor system for mounting to a ceiling portion of a vehicle, the system comprising:
    a display monitor having a viewing surface;
    a mounting assembly pivotally coupled to the monitor and adapted to be mounted on the ceiling portion of the vehicle, wherein a first portion of the mounting assembly is pivotal relative to a second portion of the mounting assembly between a stowed configuration, in which the monitor is retained proximate the ceiling portion, and a viewing configuration, in which the monitor is pivoted away from the stowed configuration to present the viewing surface for viewing by passengers in the vehicle; and
    a retention system positionable in an unactuated position, in which the system is positioned to engage the monitor and retain the monitor in the stowed configuration, and an actuated position, in which the system releases the monitor to pivot away from the stowed configuration, wherein the retention system comprises:
        a body portion;
        a retainer mounted on the body portion and pivotal about a pivot axis, wherein the retainer includes a monitor-engaging portion adapted to selectively engage the monitor when the retention system is in its unactuated position and the monitor is in its stowed position, and further wherein the monitor-engaging portion includes a contact surface oriented so that any downward forces imparted to the contact surface by the monitor are not directed to urge the retention system toward its actuated position; and
        an actuator coupled to the retainer and adapted to pivot the retainer between the actuated and unactuated positions, wherein the retainer includes an actuator-engaging portion that is coupled to the actuator by a linkage.

2. The system of claim 1, wherein the actuator-engaging portion includes a race into which at least a portion of the linkage extends.

3. A display monitor system for mounting to a ceiling portion of a vehicle, the system comprising:
    a display monitor having a viewing surface;
    a mounting assembly pivotally coupled to the monitor and adapted to be mounted on the ceiling portion of the vehicle, wherein a first portion of the mounting assembly is pivotal relative to a second portion of the mounting assembly between a stowed configuration, in which the monitor is retained proximate the ceiling portion, and a viewing configuration, in which the monitor is pivoted away from the stowed configuration to present the viewing surface for viewing by passengers in the vehicle; and
    a retention system positionable in an unactuated position, in which the system is positioned to engage the monitor and retain the monitor in the stowed configuration, and an actuated position, in which the system releases the monitor to pivot away from the stowed configuration, wherein the retention system comprises:
        a body portion;
        a retainer mounted on the body portion and pivotal about a pivot axis, wherein the retainer includes a monitor-engaging portion adapted to selectively engage the monitor when the retention system is in its unactuated position and the monitor is in its stowed position, and further wherein the monitor-engaging portion includes a contact surface oriented so that any downward forces imparted to the contact surface by the monitor are not directed to urge the retention system toward its actuated position; and
        an actuator coupled to the retainer and adapted to pivot the retainer between the actuated and unactuated positions, wherein the actuator is slidable within a travel path having a long axis, and wherein moving the actuator along the travel path positions the retention system between its actuated and unactuated positions.

4. The system of claim 3, wherein the contact surface is oriented generally toward the pivot axis of the retainer.

5. The system of claim 3, wherein the actuator includes a user-manipulable element through which user-imparted forces are directed to position the retention system between the actuated and unactuated positions.

6. The system of claim 3, wherein the mounting assembly includes a base portion mounted on the ceiling portion of the vehicle.

7. The system of claim 6, wherein the body portion of the retention system is mounted on the base portion of the mounting assembly.

8. The system of claim 3, wherein the retention system includes at least one spring adapted to bias the retention system toward its unactuated position.

9. The system of claim 3, wherein the retention system includes a spring that engages the retainer and urges the monitor-engaging portion toward a portion for engaging the monitor when the monitor is in the stowed configuration.

10. The system of claim 3, wherein the contact surface of the retainer extends at less than an obtuse angle relative to the long axis of the travel path of the actuator.

11. The system of claim 10, wherein the contact surface of the monitor-engaging portion extends at an angle in the range of approximately 50° and approximately 90° relative to the long axis of the travel path of the actuator.

12. The system of claim 11, wherein the contact surface of the monitor-engaging portion extends at an angle in the range of approximately 60° and approximately 80° relative to the long axis of the travel path of the actuator.

13. The system of claim 3, wherein the monitor includes a catch adapted to be engaged by the contact surface when the monitor is in the stowed configuration.

14. The system of claim 13, wherein the monitor includes a housing and the catch extends at least partially within the housing.

15. The system of claim 13, wherein the catch includes a surface oriented to correspond to the orientation of the contact surface of the monitor-engaging portion when the monitor is in the stowed configuration.

16. The system of claim 3, wherein the monitor is adapted to exert forces upon the monitor-engaging portion of the retainer when the retention system is in its unactuated position, the monitor is in its stowed configuration and downward forces are imparted to the monitor, and further wherein the monitor-engaging portion is oriented so that a greater component of the forces exerted upon the monitor-engaging portion are in a direction to urge the retention system toward its unactuated position than any component of the forces exerted upon the monitor-engaging portion that are in a direction to urge the retention system toward its actuated position.

* * * * *